United States Patent [19]
Born

[11] 3,919,662
[45] Nov. 11, 1975

[54] GAS DYNAMIC LASER DEVICE
[75] Inventor: Gunthard Born, Taufkirchen, Germany
[73] Assignee: Messerschmitt-Bolkow-Blohm G.m.b.H., Munich, Germany
[22] Filed: Nov. 27, 1973
[21] Appl. No.: 419,395

[30] Foreign Application Priority Data
Nov. 29, 1972 Germany............................ 2258325

[52] U.S. Cl. ........................ 331/94.5 G; 331/94.5 P
[51] Int. Cl.² .......................................... H01S 3/03
[58] Field of Search .................. 331/94.5 G, 94.5 P

[56] References Cited
UNITED STATES PATENTS

| | | | |
|---|---|---|---|
| 3,560,876 | 2/1971 | Airey | 331/94.5 |
| 3,575,669 | 2/1971 | Haeff | 331/94.5 |
| 3,594,658 | 7/1971 | Cason et al. | 331/94.5 |
| 3,713,030 | 1/1973 | Kantrowitz | 331/94.5 |
| 3,748,505 | 7/1973 | Lavarini | 331/94.5 |

OTHER PUBLICATIONS
"A Tiger in the Tube: Gas Dynamic Laser pumped with Gasoline and Sparkplug," Laser Focus, Sept. 1971, p. 16.
"Israel: Gas Dynamic Laser," Laser Focus, July 1971, p. 18.

Primary Examiner—James W. Lawrence
Assistant Examiner—B. C. Anderson
Attorney, Agent, or Firm—Wolfgang G. Fasse; Willard W. Roberts

[57] ABSTRACT

The present gas dynamic laser device is provided with an expansion chamber arranged between a heating chamber for the CO-gas and the resonance chamber. The expansion chamber is initially evacuated for producing a rarefaction wave. Between the heating chamber and the expansion chamber there are arranged rapid release means such as a valve or a diaphragm. Pressure recovering means are connected to the other side of the resonance chamber.

6 Claims, 5 Drawing Figures

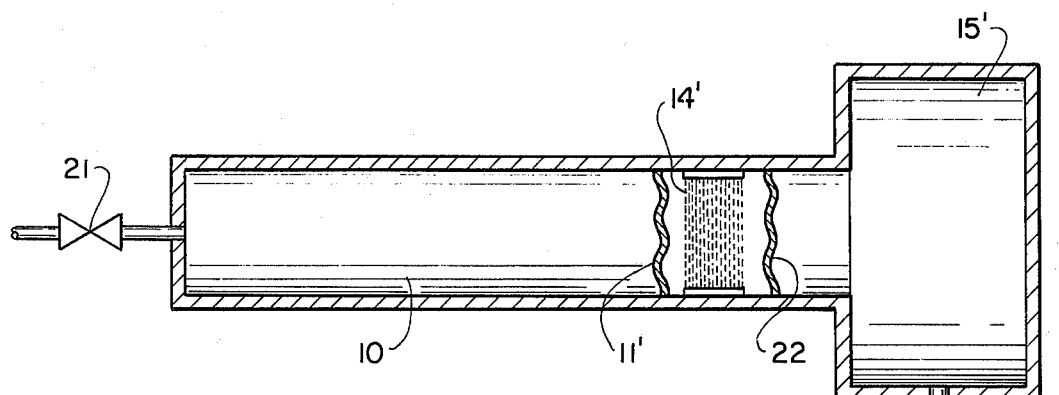
FIG.5
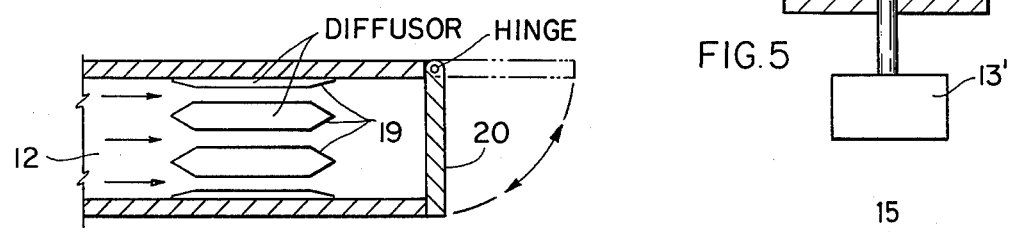
FIG.3
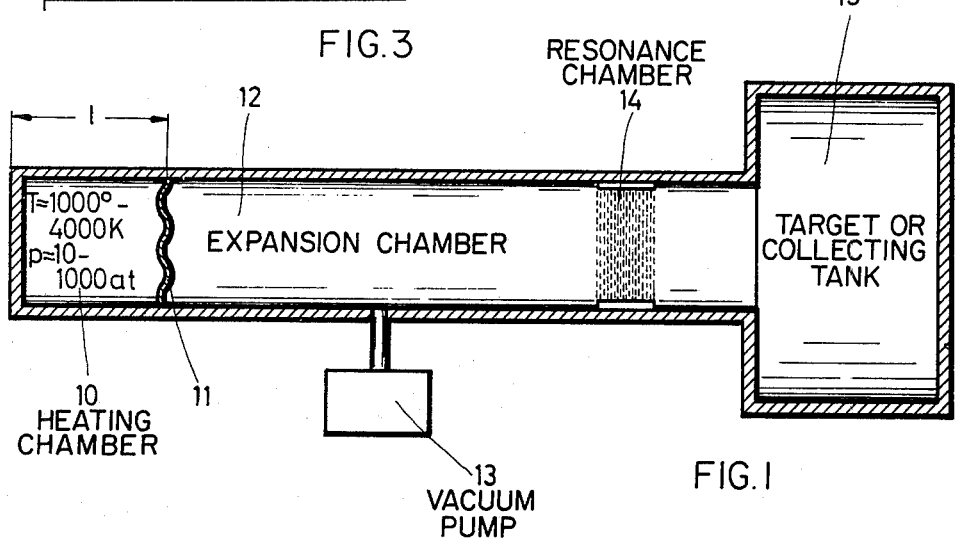
FIG.1
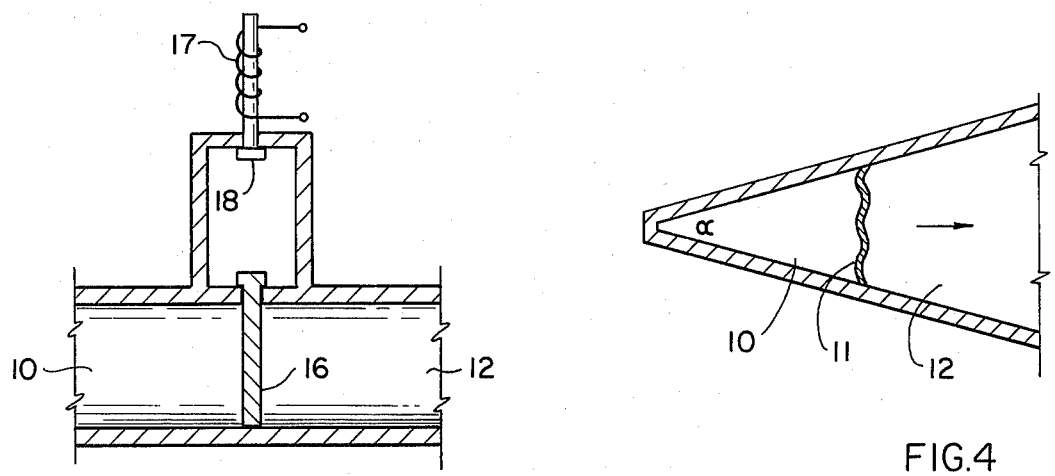
FIG.2
FIG.4

GAS DYNAMIC LASER DEVICE

BACKGROUND OF THE INVENTION

The present invention relates to a gas dynamic laser device. More specifically, the invention relates to a pulsed gas dynamic CO-transmitter or amplifier. Such gas dynamic CO-laser devices are known as such. These devices comprise preferably a heating chamber, a Laval-nozzle, a resonance chamber and a gas exhaust means or diffuser. In the heating chamber hot CO-gas is produced preferably mixed with hydrogen $H_2$ and argon whereby the temperature T is between 1000° K and 4000° K. The Laval-nozzle is shaped in such a manner that the hot gas is cooled down to very low temperatures in the range of 50° K to 100° K. This cooling is done because the low gas temperature in the resonance chamber is critical for producing an inversion in a CO-laser.

It has been found that prior art laser devices as described above have a number of drawbacks. For example, the mentioned cooling to the degree necessary by an adiabatic expansion requires 20 to 80 hypersonic nozzles for Mach numbers in the range between 10 and 20. However, such hypersonic nozzles are hard to start and thick boundary layers result in large losses. Further, the desired high power requires a high density in the resonance chamber which in turn results in high pressures in the heating or combustion chamber where the pressures may be within the range of about 1000 atm. From a practical, technical point of view such pressures are hard to control. Especially, it poses a substantial technical problem to properly dimension the required hypersonic Laval-nozzles for the high mechanical and thermic loads which occur under these operating conditions.

OBJECTS OF THE INVENTION

In view of the above, it is the aim of the invention to achieve the following objects singly or in combination:

to provide a laser device which avoids the above outlined drawbacks of the prior art, more specifically, to avoid the need for a plurality of costly, hypersonic nozzles;

to provide a gas dynamic laser device such as a CO-transmitter which is capable of high power output at relatively low pressures without the use of Laval-nozzles;

to dimension the heating chamber with due regard to the selected gas density and gas composition for adapting the cooling speed to the gas density;

to employ an expansion chamber between the heating or combustion chamber and the resonance chamber whereby such expansion chamber may be provided in the form of a so called shock tube which is especially suitable for chemical analysis, or in the form of a so called shock tube drum; and to provide the necessary expansion by means of a rarefaction wave which will assure the necessary cooling rates or speeds.

SUMMARY OF THE INVENTION

According to the invention there is provided a gas dynamic laser device having a heating chamber connected to an expansion chamber by rapid release means such as a rapid opening valve or a diaphragm. The expansion chamber in turn is connected to the resonance chamber of the device which in turn is connected to a pressure recovering means. The expansion chamber is initially evacuated for producing a rarefaction wave in the expansion chamber. By producing a rarefaction wave in an expansion chamber as taught by the invention, it is now possible to provide a gas dynamic laser device, such as a CO-transmitter having a high output at relatively small pressures without the use of Laval-nozzles.

According to the invention the expansion effect or rather the cooling effect may be even amplified by providing an expansion chamber of diverging shape from the combustion chamber toward the resonance chamber. Preferably, the combustion chamber and the expansion chamber may have a divergent shape toward the resonance chamber.

In a pulsed gas dynamic $CO_2$-laser, the cooling rates achievable by means of a rarefaction wave are not sufficient for a "freezing" of the upper laser level. This is so at least in connection with $CO_2$-laser devices of suitable dimensions ($\geq$ dm$^3$) and at pressures exceeding about 10 atm. Contrary thereto, in the apparatus according to the invention, the lifetime of the upper CO-laser level is so long that the expansion disclosed herein by means of a rarefaction wave according to the invention results in the necessary cooling rates. The cooling causes an inversion so that laser energy may be derived from the resonance chamber.

BRIEF FIGURE DESCRIPTION

In order that the invention may be clearly understood, it will now be described, by way of example, with reference to the accompanying drawings, wherein:

FIG. 1 is a schematic longitudinal sectional view through a laser device according to the invention;

FIG. 2 illustrates a rapid release valve which may replace the diaphragm shown in FIG. 1;

FIG. 3 illustrates the use of a diffuser as a pressure recovery means;

FIG. 4 illustrates a modification of FIG. 1 whereby the heating chamber and the expansion chamber have a diverging shape; and FIG. 5 illustrates a modification wherein the expansion chamber according to the invention constitutes a so called shock tube.

DETAILED DESCRIPTION OF EXAMPLE EMBODIMENTS

FIG. 1 illustrates a sectional view through a laser device according to the invention. A closed heating chamber 10 is illustrated at the left hand end of the device. The temperature in the heating or combustion chamber is in the range of about 1000° K to 4000° K. The pressure in the heating chamber 10 is within the range of about 10 atm to 1000 atm. Hot CO-gas is produced in this chamber by heating means such as a cyanogen compound, for example $C_2N_c$ or $C_6N_4$ together with nitrogen oxide NO, $NO_2$, $N_2O$ or with air.

Initially, the chamber 10 is closed off from the expansion chamber 12 provided according to the invention, by rapid release means such as a frangible diaphragm 11 or a rapid opening valve as will be described with reference to FIG. 2. The expansion chamber 12 is connected to an evacuating means such as a pump 13. The expansion chamber 12 is connected to a resonance chamber 14 from which laser energy may be derived in a manner known as such. The resonance chamber 14 in turn is connected to a pressure recovery means such as a collecting tank 15.

When the predetermined temperature and the given pressure is reached, the diaphragm 11 raptures suddenly or the valve opens suddenly and the hot gas expands into the expansion chamber 12 which prior to said expansion has been evacuated to a low pressure of, for example $\leq 10^{-3}$ atm.

As a result of said expansion in the expansion chamber 12, a rarefaction wave is produced which propagates from the location of the diaphragm 11 into the hot gas whereby the gas, which is accelerated toward the resonance chamber 14, is cooled down to a substantial extent, namely to a temperature within the range of about 50° K to 100° K which is necessary for causing an inversion. After flowing through the resonance chamber 14 the gas is collected in a closed ballast tank 15. As mentioned, the cooling of the hot gases causes an inversion which in turn makes it possible to derive laser energy from the resonance chamber.

Referring further to FIG. 1, the length $l$, as viewed in the direction of gas flow, is selected with due regard to the gas density and the gas composition in order to achieve a cooling down speed which is compatible with the gas density. For example, the product of the length $l$ and the gas pressure $p$ may be expressed as a constant, thus:

$$l \cdot p \leq 10^3 \text{bar} \cdot m$$

wherein $l$ is the length of the heating chamber 10 in meters ($m$) and wherein $p$ is the gas pressure in bar.

Incidentally, the diaphragm 11 may be made, for example, from aluminum or brass and it may also be made from rubber or synthetic materials depending on the desired output of the laser device.

FIG. 2 illustrates a modification of FIG. 1 in which the combustion chamber 10 is initially separated from the expansion chamber 12 by a rapid opening valve 16 which, for example, may be actuated by a solenoid 17 with a suitable armature 18 for lifting the closure valve 16. Any other suitable actuator means, for example hydraulic actuator means, may also be employed.

FIG. 3 illustrates a modification of the laser device according to the invention wherein the target or collection tank 15 of FIG. 1 has been replaced by a diffuser 19 and wherein the outer end is provided with a closure member 20 which, for example, may be hinged to the housing of the apparatus for opening and closing the outer end of the laser device. The diffuser 19 causes a redensification or compression of the gas which is then released to the atmosphere through the outer end of the device whereby the closure member 20 is opened.

FIG. 4 illustrates an embodiment wherein the expansion chamber 12 and the heating chamber 10 are constructed in a divergent shape relative to the direction of gas expansion as indicated by the arrow in FIG. 4. The angle $\alpha$ may range from 0° to 360° depending on the type of construction. The illustrated divergent shape amplifies the expansion effect and thus the cooling effect achieved by the creation of a rarefaction wave. Where the expansion is two dimensional, the expansion range would be cylindrically symmetric. Where the expansion is three dimensional, the expansion range would be spherically symmetric.

According to a further embodiment of the invention, a shock tube for chemical analysis may be operated in accordance with the present teachings. Shock tubes for chemical analysis are known as such, see for example "Journal Chem. Phys." Volumn 27, 1957, page 850. This embodiment is schematically shown in FIG. 5. The heating chamber 10 is provided with an inlet valve 21 for the driving gas. A diaphragm 11' separates the resonance chamber 14' from the heating chamber 10. A further diaphragm 22 separates the resonance chamber 14' from a further chamber 15' which according to the invention is connected to an evacuating pump 13'. According to the invention laser energy may be derived or decoupled from the resonance chamber 14' of the shock tube operated in accordance with the present teachings. The details of operation of a shock tube for chemical analysis purposes are known as such. Therefore a more detailed description is not necessary in the present context. It should, however, be mentioned that the expansion is amplified by the reflection of rarefaction waves in the shock tube arrangement.

According to the invention, a so called shock tube drum may also be employed in accordance with the present teachings so that the expansion chamber constitutes such a shock tube drum. Shock tube drums as such are known, for example, from U.S. Pat. Nos. 2,832,666 and 2,902,337. By the combination of the present teachings with the shock tube drum, it is possible to achieve a continuous signal laser arrangement due to the sequentially occuring pulsed expansions.

In view of the foregoing, it will be appreciated that the teachings of the present invention avoid the use of Lavalnozzles so that now large cross-sections are possible. This has the advantage that boundary layers are no longer of any concern. By cooling the laser gas by means of a rarefaction wave or a plurality of sequentially occuring rarefaction waves, a laser device has been provided, which has high output power while simultaneously employing a simple structure and arrangement.

Although the invention has been described with reference to specific example embodiments, it will be appreciated, that it is intended to cover all modifications and equivalents within the scope of the appended claims.

What is claimed is:

1. A gas dynamic laser device comprising a heating chamber for producing heated CO-gas, and a resonance chamber, an expansion chamber interconnecting said heating chamber and said resonance chamber, evacuating means operatively connected to said expansion chamber for initially evacuating said expansion chamber, pressure recovering means operatively connected to said resonance chamber, and rapid release means located directly between said heating chamber and said expansion chamber, whereby in said initially evacuated expansion chamber a rarefaction wave is produced, said rarefaction wave producing a cooling rate sufficient to cause an inversion for deriving laser energy from said resonance chamber.

2. The gas dynamic laser device according to claim 1, wherein said rapid release means comprise a frangible membrane.

3. The gas dynamic laser device according to claim 1, wherein said rapid release means comprises a rapid opening valve.

4. The gas dynamic laser device according to claim 1, wherein said pressure recovering means comprise a target or collecting tank.

5. The gas dynamic laser device according to claim 1, wherein said pressure recovery means comprise a diffuser.

6. The gas dynamic laser device according to claim 1, wherein said heating chamber and said expansion chamber have a divergent shape as viewed in the direction of gas flow.

* * * * *